No. 849,432. PATENTED APR. 9, 1907.
E. A. SPERRY.
ELECTRIC LOCOMOTIVE.
APPLICATION FILED NOV. 26, 1902.
2 SHEETS—SHEET 1.
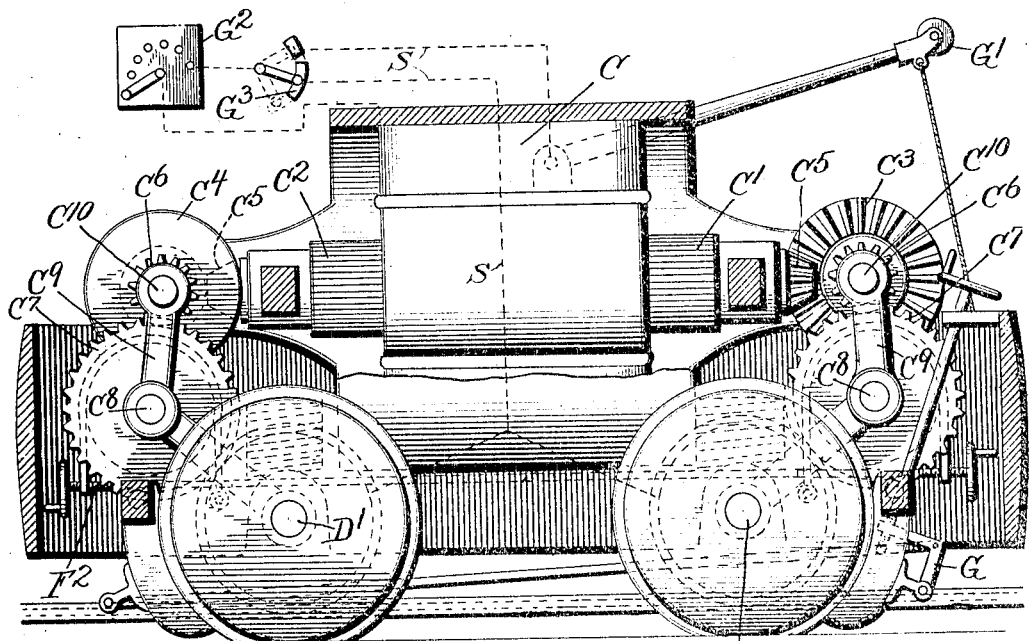
Fig. 1.
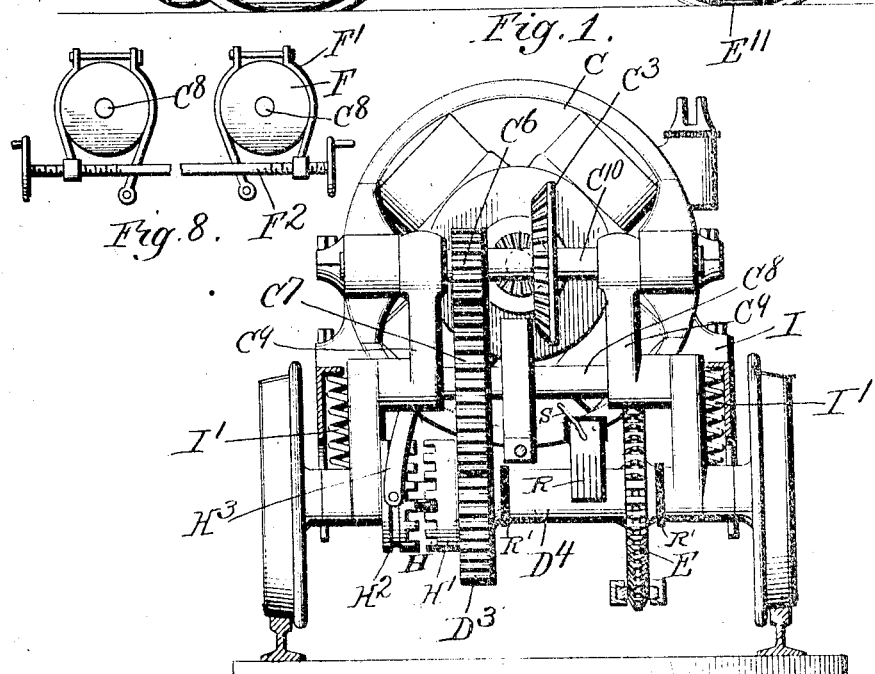
Fig. 8.
Fig. 2.
WITNESSES
INVENTOR
Elmer A. Sperry
By Parker & Carter
Attorneys

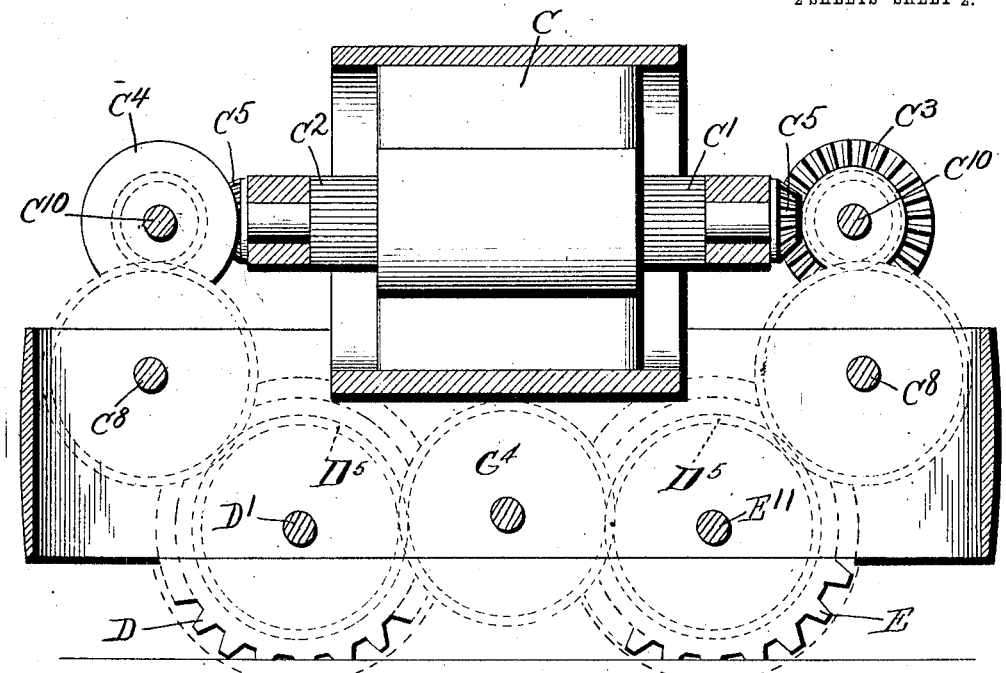
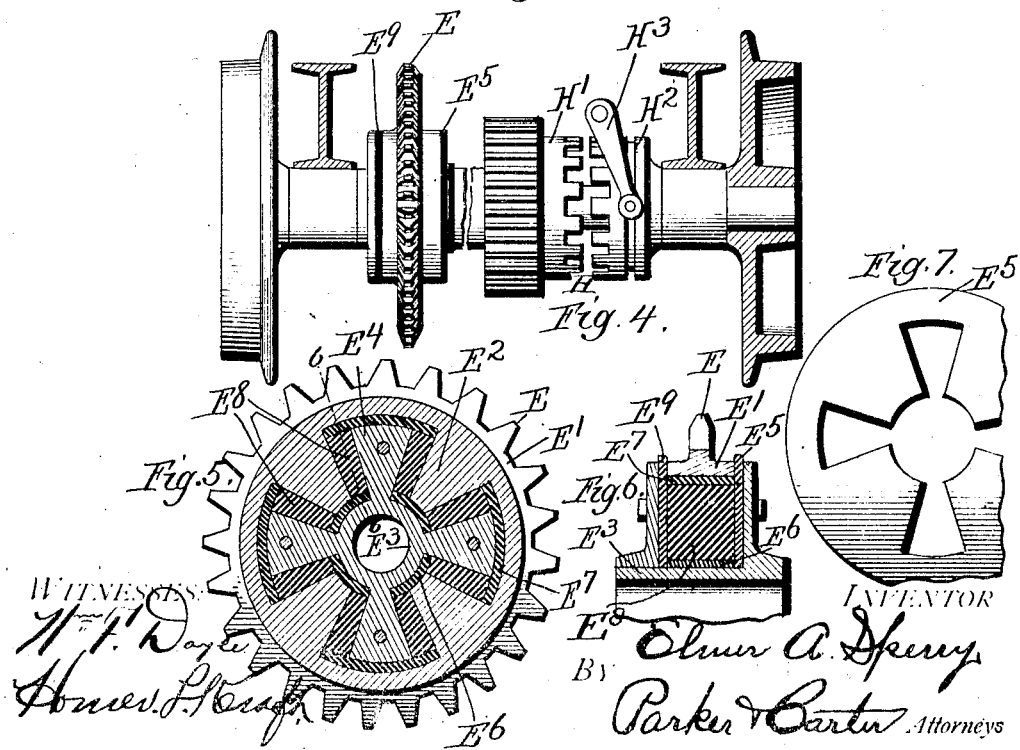

UNITED STATES PATENT OFFICE.

ELMER A. SPERRY, OF CLEVELAND, OHIO, ASSIGNOR TO GOODMAN MANUFACTURING COMPANY, OF CHICAGO, ILLINOIS, A CORPORATION OF ILLINOIS.

ELECTRIC LOCOMOTIVE.

No. 849,432.

Specification of Letters Patent.

Patented April 9, 1907.

Application filed November 26, 1902. Serial No. 132,847.

*To all whom it may concern:*

Be it known that I, ELMER A. SPERRY, a citizen of the United States, residing at Cleveland, in the county of Cuyahoga and State of Ohio, have invented a certain new and useful Improvement in Electric Locomotives, of which the following is a specification.

The invention relates to an electric rack-rail locomotive, and has for its object to provide a new and improved construction of this description.

My invention is illustrated in the accompanying drawings, wherein—

Figure 1 is a side elevation, partly in section, of one form of my locomotive. Fig. 2 is an end elevation, also partly in section, of same. Fig. 3 is a sectional part of a side elevation of the locomotive, showing the center couple of the propelling-gears. Fig. 4 is a detail of a car-axle, all mounted parts, including the clutch or detachable drive connection. Figs. 5, 6, and 7 are details of one method of insulating the propelling-gear. Fig. 8 shows the brake for the intermediate gearing.

Similar letters of reference refer to similar parts throughout the drawings.

I have shown various arrangements of the details and parts of the structure and a peculiar system of mounting for cushion-support and method of mounting the propelling-gears engaging the rack, so as to allow of cushion support to the superstructure, means whereby the locomotive may be used both through its rack-rail connection and the ordinary adhesion upon the rails, and duplicate means for running contact with the electrical supply, means of insulation and resilient action of the propelling-gears, means for coupling the two propelling-gears together, with other features clearly described hereinafter and definitely pointed out in the claims.

The general design of the locomotive embodying the elements of the present invention involves the use of a power source, mounted upon a truck which rests upon an ordinary railway track parallel and adjacent to which there exists a rack arranged to be engaged by preferably two or more propelling-gears upon the locomotive, which may be so driven and connected to a common power source as to be coupled together for synchronous action through the medium of a revolving part of such power source. In such instance I have found that the backlash or lost motion of the double-gear trains renders it insufficient as a coupling, and inasmuch as considerable accuracy is required, I have deemed it best to couple these gears or their attached parts directly, as by an idler. (Shown in Fig. 3.) Again, especially with electric motors, an elastic suspension should be provided to eliminate the pounding, jar, and concussion coming from the car-wheels in passing rough track, frogs, &c. The difference, however, with a rack-rail locomotive is that a certain pitch engagement must be maintained with the rack, which cannot rise and fall with the movements of the spring-mounted structure. I overcome this by mounting the sprockets or propelling-gears upon the locomotive-axles themselves, the power connection with the motor being of such a character as to allow free movement of a spring-supported motor.

With a rack-rail locomotive a very large draw-power pull for hauling heavy trains is developed by a locomotive which in itself is very light in weight. This light weight makes it suitable for "gathering" and lighter switching duties at the "partings," as in mines, &c.; but the rack-rail is expensive to install, and the faces and workings are usually only temporary and would not warrant the expenditure. I have devised a plan to enable my locomotive to fulfil this important additional service by effecting a power connection between the propelling-gear and car-axle and at the same time bringing into play an overhead trolley system in lieu of the third rack-rail. Again, I have found the overhead trolley valuable at partings and muleways, in the region of which the current may be disconnected from the rack-rail entirely, and therefore left free of its insulated protection and rendered simpler in installation, and especially at intricate places in the road-bed, as above specified. I have further found that in taking curves, switches, frogs, &c., the locomotive runs smoother where the propelling-gears are in the center or middle region of the locomotive—in fact, placed as near together as is consistent with the gears or openings in the rack at crossovers, &c.

Where the propelling-gear is insulated and where it is used as a part of the electric circuit, I find it best to employ an exterior rubbing contact, preferably located upon a cylindrical portion of the hub. (See Fig. 2.) In insulating this driving-gear I have found it convenient to employ a resilient insulating material, thereby securing the additional advantage of a yielding drive, which with the coarse-pitch teeth employed is desirable.

Certain switches are employed to control the circuit connections between the motor and the duplicate sources of electrical supply or running contact.

In the drawings a multipolar motor C is shown with its armature suitably mounted in motor-bearings, the armature being removable upwardly after the upper half of the field-yoke is removed at joints on the horizontal line, as shown. The armature is shown as having two commutators $C'$ and $C^2$ for the purpose of better facilitating speed and power control by any of the well-known means. The opposite ends of the armature-shafts are coupled each to a propelling-gear D and E through intermediate gearing consisting of a bevel-pinion $C^5$ on the armature-shaft coöperating with bevel-gears $C^3$ $C^4$ on the gear-shaft which carries a pinion $C^6$, driving a gear $C^7$ upon the shaft $C^8$. Said shaft $C^8$ is not fast, but may be movable, and is supported by the toggle-links $C^9$, (shown in Figs. 1 and 2,) which couple it, respectively, to the gear-shaft $C^{10}$ and gear $D^3$ on the sleeve-axis $D^4$, compelling proper gear relation to each, but allowing relative movement between them, whereby the truck-frame may be yieldingly supported, the propelling-gear maintain its relation with the rack, and the power connection properly maintained.

On the intermediate gear at each end or attached surface is applied a brake. (See Figs. 2 and 8.)

Upon shaft $C^5$ is a disk F, about which is a brake-strap $F'$, having one end preferably fastened to a fixed part, the other end being adjustably connected to the controlling part $F^2$. The same controlling part $F^2$ is used in both sets of brakes. It will here be seen that the brake-applying mechanism offers the additional valuable function of an equalizer between the sets of brakes. The car-wheels themselves are also provided with brakes equalized by the floating fulcrum of the bell-crank brake-applying lever G, attached to the brake-beam, to the right in Fig. 1 of the drawings.

The current to drive the motor may come in at the sprocket from the third rack-rail and connected by brush R and suitable wiring connections (indicated at S, see Figs. 1 and 2) to switch $G^3$ and controller $G^2$ to the motor, or current may be taken in from the trolley $G'$ and received by the motor through controller $G^2$ and switch $G^3$, by means of which the motor connections may derive energy from one or the other of the sources, or they may be both open-circuited or both used in conjunction.

The propelling-gears D and E are mounted on sleeves $D^4$ on the car-axles $D'$ and $E''$, and I provide an extra connecting-gear or idler $G^4$ between the propelling gear-sleeves, or, more properly, the gears $D^5$ thereon, as shown in Fig. 3, by the use of which the backlash of the gear-trains is prevented from allowing the propelling-gears to get out of step on crossovers or at joints and gaps in the traction-rail; but, if desired, the sleeves $D^4$ may be insulated at their ends, as indicated at $R'$, Fig. 2, from adjacent parts of the frame.

The sleeves which carry the gears D E are loosely sleeved upon the axles $D'$ $E''$ and is driven through the train of gears above described from the motor, so that the motor may receive current from the traction rack-rail with which the traction-gears engage, while at the same time the gears E and rails operate as traction devices to effect the progression of the truck along the track-rails. Where the trolley is employed to supply current to the motor, the traction-gears D E, through their engagement with the rack-rail, serve merely the function of propelling the truck, or, if desired and in addition, as part of the return or ground circuit of the motor. It may sometimes be desirable to operate the truck along portions of the track where a third conductor or traction-rail has not been installed, the motor receiving current through the trolley, as before; but instead of the propulsion of the truck being effected through the traction-gears D E it is necessary to provide other means driven from the motor for effecting the propulsion of the truck. To this end I provide a clutch (indicated at H) comprising the members $H'$ $H^2$, the member $H'$ being connected to the sleeve $D^4$, or rather to the train of gearing driven from the motor through which said sleeve is rotated upon the axle, while the member $H^2$ of the clutch is sleeved upon and splined to rotate with the axle. Therefore by throwing the member $H^2$ of the clutch into engaging relation with the member $H'$ thereof the axle is geared to be rotated or driven from the motor, in which event the propulsion of the truck is effected through the truck-wheels instead of through the traction-gears D E. In this manner the locomotive is made convertible to be used as a combined third and traction rack-rail and conductor-locomotive or not, as may be desired.

In Figs. 5, 6, and 7 one method of insulating the propelling-gear is detailed. Here it will be seen that the gear-teeth are mounted upon a ring $E'$, provided with internal clutch-like projections $E^2$. The hub $E^3$ is provided with coöperating outward projections E⁴, which are secured to the disk forming, preferably, a part of the hub. (Fig. 6 is section on line 6 6, Fig. 5.) A flanking disk of insulation E⁵ (shown in Fig. 7) is used next to this hub-disk to cover its surface. Internal and external curved pieces E⁶ E⁷ are next inserted, whereby clutch-like projections are effectively insulated from each other in line of radius. Next the blocks of insulation E⁸ are placed around the circle between the opposite projections, in the present instance eight in number. Another insulating flanking disk E⁹ is then brought up and the whole securely clamped into a solid mass, or the eight blocks may be of resilient insulating material, soft or semisoft rubber, which while effectively insulating will be found to give to the structure a slightly-yielding action between the teeth and the hub. The motor is mounted upon a suitable frame I, and this frame is elastically connected with the car-axles—as, for example, by the springs I'. It will thus be seen that the frame and the motor are thus elastically mounted upon the axles and that the motion due to this mounting is taken up by the intermediate gear C⁷ and that the propelling-gears are not moved with relation to their engagement with the rack, but have a constant engagement at all times, regardless of the movement of the frame and motor.

I have shown in detail a particular construction embodying my invention; but it is of course evident that the parts may be varied in many particulars, as well in the construction as in the arrangement, without departing from the spirit of my invention.

I have illustrated in detail a particular construction embodying my invention; but it is of course evident that this construction may be greatly varied and that some of the parts may be omitted and others used with parts not here shown without departing from the spirit of my invention.

By means of this invention the operation of electric railway systems, particularly in such places as mines and tunnels, and especially where grades exist, is very greatly simplified and made much cheaper and more efficient and satisfactory and permits the adaptation to circumstances and conditions not commercially possible in the ordinary electric-railway system. The arrangement of electrical and mechanical control herein illustrated permits an efficient and reliable control of the motor under economical conditions and insures a certain protection and efficient action wholly absent in the ordinary electric-railway systems.

I claim—

1. The combination in a rack-rail locomotive of a motor elastically mounted upon the axles, a propelling-gear adapted to engage the rack, a movable intermediate power connection between the motor and the propelling-gear whereby the motor and its frame are free to move without causing a similar movement of the propelling-gear.

2. The combination in a rack-rail locomotive of a motor, two propelling-gears adapted to engage the rack, a driving connection from the motor to these two gears and an independent connection between the two gears whereby they are kept in a predetermined relation.

3. In an electric rack-rail locomotive, a truck-frame, a motor and a propelling-gear adapted to engage the rack both mounted on the truck-frame, car-wheels resting on a track, the gear mounted for constant vertical relation with the wheels, and a resilient medium between the wheels and said motor.

4. In an electric rack-rail locomotive, a truck-frame, a propelling gear or gears engaging the rack, car-wheels resting upon a track, a motor or motors upon the locomotive, driving connections to the propelling-gears, and a brake attached to the driving connections.

5. In an electric rack-rail locomotive, a truck-frame, a propelling gear or gears engaging the rack, car-wheels resting upon a track, a motor or motors upon the locomotive, two sets of driving connections to the propelling-gears, and a brake attached to each set of the driving connections.

6. An electric rack-rail locomotive, a truck-frame, a propelling gear or gears engaging the rack, car-wheels resting upon a track, a motor or motors upon the locomotive, two sets of driving connections to the propelling-gears, a brake attached to each set of the driving connections, a brake-applying device for each brake and an equalizer between the brakes.

7. In an electric rack-rail locomotive, a truck-frame, a propelling gear or gears engaging the rack, car-wheels resting upon a track, brakes for the wheels and an independent set of brakes for the propelling-gears.

8. In an electric rack-rail locomotive, a truck-frame, a propelling gear or gears engaging the rack, car-wheels resting upon a track, an axle for the wheels, a propelling-gear mounted thereon, and a detachable driving connection between them.

9. In an electric rack-rail locomotive, a truck-frame, a propelling gear or gears engaging the rack, car-wheels resting upon a track, an axle for the wheels, a propelling-gear mounted thereon by a hub so as to revolve freely upon the axle, a driving connection or gear upon the hub, and a detachable driving connection between them.

10. In an electric rack-rail locomotive, a truck-frame, a propelling gear or gears engaging the rack, car-wheels resting upon a track, an axle for the wheels, a propelling-gear mounted thereon, and a resilient medium between the motor and the propelling-gear.

11. In an electric rack-rail locomotive, a truck-frame, a propelling gear or gears engaging the rack, car-wheels resting upon a track, an axle for the wheels, a propelling-gear mounted thereon but insulated therefrom, an electrical connection extending from the truck-frame to the insulated propelling-gear, and an electric switch in circuit with the connection.

12. In an electric rack-rail locomotive, a truck-frame, a propelling gear or gears engaging the rack, car-wheels resting upon a track, an axle for the wheels, a propelling-gear mounted thereon but insulated therefrom, and a detachable driving connection between them.

13. In an electric rack-rail locomotive, a truck-frame, a propelling gear or gears engaging the rack, car-wheels resting upon a track, an axle for the wheels, a propelling-gear mounted thereon but insulated therefrom in whole or part by a resilient insulating medium.

14. In an electric rack-rail locomotive, a truck-frame, a propelling gear or gears engaging the rack, car-wheels resting upon a track, a power-driven revolving part, the propelling-gear mounted upon but electrically insulated therefrom, and a resilient insulating medium between the part and gear.

15. An insulated propelling-gear for a rack-rail electric locomotive consisting of a ring near to and supporting the teeth, clutch-like projections connected to the ring, coöperating projections for driving the gear, insulating material between the projections, and flanking faces also of insulating material.

16. An insulated propelling-gear for a rack-rail electric locomotive consisting of a ring near to and supporting the teeth, clutch-like projections connected to the ring, coöperating projections for driving the gear, insulating material between the projections, flanking faces also of insulating material, and bolts parallel to the axis for holding the mass together.

17. An insulated propelling-gear for a rack-rail electric locomotive consisting of a ring near to and supporting the teeth, clutch-like projections connected to the ring, coöperating projections for driving the gear, flanking faces of insulating material, for holding the gear laterally and resilient insulating material between the projections.

18. A spring-mounted rack-rail locomotive comprising a truck-frame, truck wheels and axles supporting such frame, a propelling-gear mounted upon the car-axle, and a flexible power connection to the propelling-gear.

19. In an electric rack-rail locomotive, a truck-frame, a propelling gear or gears engaging the rack, car-wheels resting upon a track, a resilient medium between the wheels or connected part and the truck, a motor on the truck and a yielding power connection to the propelling-gear.

20. A spring-mounted rack-rail locomotive comprising a truck-frame, truck wheels and axles supporting such frame, a propelling-gear being mounted upon the car-axles, a flexible power connection to the propelling-gear, comprising an intermediate gear and a swinging journal for the intermediate gear.

21. In an electric rack-rail locomotive resting upon a track, insulated propelling-gear engaging an insulated rack, an electric motor on the locomotive, an overhead-trolley system and electrical connections for the motor extending to both the rack connections and the trolley.

22. In an electric rack-rail locomotive resting upon a track, insulated propelling-gear engaging an insulated rack, an electric motor on the locomotive, an overhead-trolley system and electrical connections for the motor extending to both the rack connections and the trolley, and electrical switches for disconnecting either one or both said sources of supply.

23. In an electric rack-rail locomotive resting upon a track, insulated propelling-gear engaging an insulated rack, an electric motor on the locomotive, in combination with a duplicate electrical traveling-contact system of electrical circuits for the motor.

24. In an electric rack-rail locomotive resting upon a track, insulated propelling-gear engaging an insulated rack, an electric motor on the locomotive, in combination with a duplicate electrical traveling-contact system of electrical circuits for the motor, electrical circuits for the motor, and a branch leading to each of said systems.

25. In an electric rack-rail locomotive resting upon a track, insulated propelling-gear engaging an insulated rack, an electric motor on the locomotive, in combination with a duplicate electrical traveling-contact system of electrical circuits for the motor, and current-control devices in the circuits.

26. In an electric rack-rail locomotive, a truck-frame, two propelling-gears engaging the rack, car-wheels and track for supporting the truck-frame, an electric motor on the locomotive and duplicate power connections from the motor, one extending to each propelling-gear, the connections each consisting of gear-trains and a power connection extending directly between the two propelling-gears or their attached parts.

27. In an electric rack-rail locomotive, a truck-frame, two propelling-gears engaging the rack, car-wheels and track for supporting the truck-frame, an electric motor common to the propelling-gears and serving as a medium of power connection between them.

28. In an electric rack-rail locomotive, a truck-frame, two propelling-gears engaging the rack, car-wheels and track for supporting the truck-frame, an electric motor common to the propelling-gears, the rotating part of which serves as a medium of power connection between the two.

29. In an electric rack-rail locomotive or car, car-wheels for supporting the structure, an electric motor upon the car, electrically-insulated propelling mechanism engaging the rack, duplicate electric traveling-contact systems for the car and a detachable driving connection between the motor and the car-wheels.

30. In an electric rack-rail locomotive, a propelling gear or gears engaging the rack, car-wheels resting upon the track, an axle for the wheels, a motor upon the locomotive, a propelling-gear mounted upon the axle, a detachable driving connection between the propelling-gear and axle, duplicate traveling-contact systems of electric supply and a contact device upon the locomotive for connecting each system with the motor

ELMER A. SPERRY.

Witnesses:
PHILIP F. LARNER,
H. M. ELLIS.